Oct. 14, 1947.   E. H. WITTENBERG   2,429,149
PRESSURE RELEASE DEVICE
Filed Oct. 2, 1944

INVENTOR
EDWARD H. WITTENBERG
By Paul, Paul & Moore
ATTORNEYS

Patented Oct. 14, 1947

2,429,149

UNITED STATES PATENT OFFICE 2,429,149

PRESSURE RELEASE DEVICE

Edward H. Wittenberg, Eau Claire, Wis., assignor to National Pressure Cooker Company, Eau Claire, Wis., a corporation of Wisconsin Application October 2, 1944, Serial No. 556,717

11 Claims. (Cl. 220—44)

This invention relates to new and useful improvements in pressure release devices and more particularly to a novel pressure release device which may be readily and conveniently embodied in a wall of a pressure chamber, as for example, the wall of a pressure cooker, to automatically release the pressure therefrom, should it for some reason become excessive.

In the operation of such pressure devices as for example, pressure cookers, it is extremely important that some safe and reliable means be provided in the construction thereof for preventing excessive pressures from developing within the cooker, which if not promptly released before it reaches a dangerous value, may cause serious damage to the cooker and adjacent property, and possible injury to an attendant stationed at or near the cooker. Such devices when actuated by over-pressure within the pressure chamber should be so constructed that they may readily be restored to their normal operating condition in the wall of the pressure chamber or cooker, whereby they may again function to seal the opening in the wall of the pressure chamber under normal operating conditions.

The novel pressure release device hereindisclosed is extremely simple and inexpensive in construction and may readily and quickly be inserted in the opening provided in the wall of the container by an inexperienced person, should it accidentally be sufficiently distorted from excessive pressure within the pressure chamber to cause it to be blown from the wall of the chamber.

In addition to providing a seal for the usual pressure release opening provided in the wall of the container, the novel device hereindisclosed also functions to permit atmospheric air to escape from the pressure chamber or cooker when the latter is initially started. This is a highly desirable feature in that it is well known that atmospheric air entrapped within a pressure cooker may greatly change the flavor of the food, if not released from the cooking chamber before the cooking operation actually starts. The device in addition to releasing atmospheric air, also prevents the formation of a vacuum within the cooking chamber during the cooling-off period of the cooker, which is desirable when processing various kinds of foods.

An object of the present invention therefore is to provide a novel pressure release valve or device comprising a disk-like member or element of a suitable synthetic rubber-like material as, for example, "neoprene," or various other similar materials now suitable or for this purpose which have the inherent characteristics of withstanding high temperatures and being highly resistant to deterioration by oils and greases contained in foods, to which such a device is continuously subjected when used on a pressure cooker.

A further object is to provide a device of the character disclosed which, when in normal position as when the cooker is cold, provides an opening for the escape of atmospheric air from the cooking chamber, when the cooker is initially started, and when a slight pressure begins to develop within the cooker after the ejection of the atmospheric air therefrom, said device is moved by pressure into sealing engagement with a wall portion of the opening in the cooker wall, thereby to prevent further escape of pressure from the cooker during the cooking period, and when the cooking period is terminated and the pressure within the cooker gradually recedes during the cooling-off period of the cooking chamber, said device returns to its normal or initial position and thus automatically opens the cooking chamber to the atmosphere, whereby the formation of a vacuum within the cooking chamber is positively prevented without any care on the part of the attendant.

Other objects of the invention reside in the simple and inexpensive construction of the device; in the manner of supporting it in the wall of the container whereby it may readily respond to pressure within the cooking chamber to seal the opening in the wall thereof during the cooking period; in the unique shape of the element which is in the form of a relative thin disk formed from a suitable material which is sufficiently elastic to yield under excessive pressure whereby it may readily be forced out of engagement with its seat to permit excessive pressure to escape from the cooking chamber; in the arrangement of the retaining ring which supports the sealing element within the opening in the container wall, and which ring has an opening therein for the passage or escape of atmospheric air from the cooking chamber upon initial starting of the cooker and through which atmospheric air may enter the cooking chamber at the termination of the cooking period; and in the provision of a single element which initially permits atmospheric air to escape from the cooking chamber, then seals the chamber against pressure leakage during the cooking period, and finally permits atmospheric air to enter the cooking chamber to prevent the formation of a vacuum therein.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
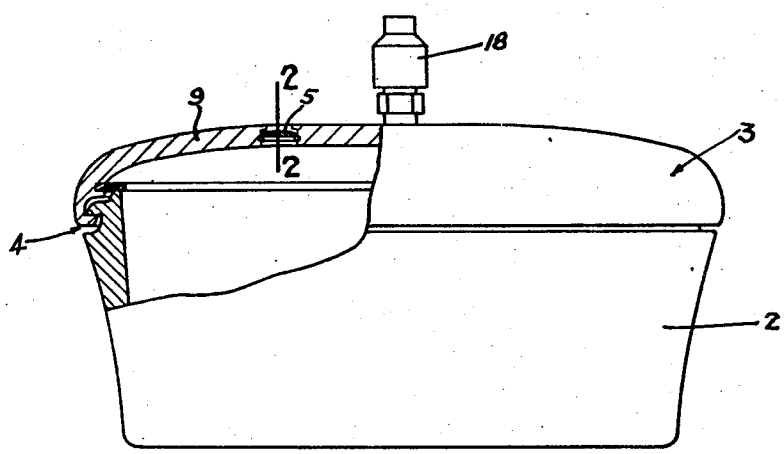
Figure 1 is a view showing the invention applied to a pressure cooker.

In the selected embodiment of the invention herein shown, there is illustrated in Figure 1, a conventional pressure cooker of the sauce pan type comprising a body 2, having a cover 3 secured thereto in leak-tight relation by suitable interlocking means, indicated at 4.

The novel safety or pressure release device herein disclosed is shown comprising a disk-like element 5 which preferably is formed from a suitable soft synthetic rubber-like material such as "neoprene," or similar material which has the inherent characteristics of withstanding high temperatures and is highly resistant to the deterioration by oils and greases such as contained in various foods.

In the drawing I have shown the sealing element 5 as having a convex upper face 6 and its lower face 7 may be made substantially flat as shown, although not necessarily. If desired, the top and bottom surfaces of the sealing element 5 may be similarly shaped or fashioned.

Figure 2:
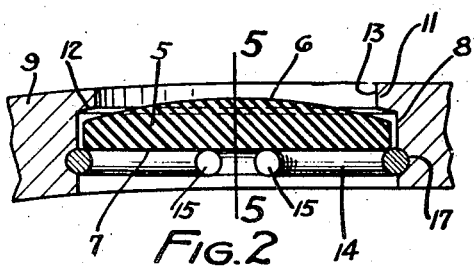
Figure 2 is an enlarged detail sectional view on the line 2—2 of Figure 1, showing the manner of supporting the pressure release element in the container wall and with the element in the position assumed when the cooker is cold.

In the drawing the sealing element 5 is supported in a suitable aperture 8, in the present instance shown provided in the top wall 9 of the cover 3 of the cooker. The aperture 8 terminates at its upper end in an inwardly turned or directed flange 11 whose bottom face 12 serves as an abutment shoulder or seat for the annular marginal edge of the sealing element 5, as will be readily understood by reference to Figures 2 and 3 of the drawings. The flange 11 defines an opening 13 which it will be noted by reference to Figures 2, 3 and 4 is relatively smaller than the aperture 8 provided in the wall of the cover.

Figure 7:
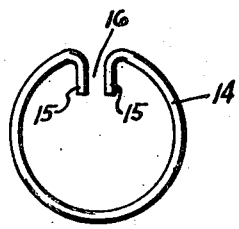
Figure 7 is a view showing the preferred form of lockring.

The sealing element 5 is retained in operative position in the aperture 8 by a suitable lockring 14, preferably having its terminals 15 bent inwardly as shown in Figure 7 and spaced apart to provide a gap 16 therebetween. The lockring is seated in an annular groove 17 provided in the wall of the aperture 8, as clearly illustrated. By reference to Figures 2, 3, and 4 it will be noted that the lockring 14 is spaced downwardly from the seat 12 a distance slightly greater than the thickness of the marginal edge of the sealing element 5, whereby a gap is provided between the seat 12 and the sealing element 5, when the sealing element is resting on the lockring 14 as when the cooker is cold.

Figure 5:
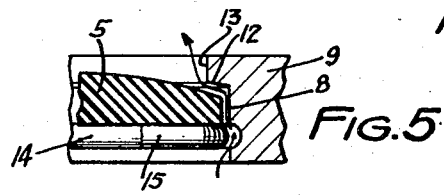
Figure 5 is a detail sectional view on the line 5—5 of Figure 2, showing the passage provided around the edge of the sealing element and through the gap in the lockring when the sealing element is in the position shown in Figure 2.

When the sealing element is thus supported on the lockring, atmospheric air within the cooker may escape to the atmosphere through the gap 16 provided between the ends of the lockring and around the edge of the sealing element and then through the opening 6, as indicated by the arrows in Figure 5. It should also be noted that the diameter of the sealing element is relatively smaller than the diameter of the aperture 8 whereby an annular gap is provided between the peripheral edge of the sealing element and the wall of the aperture 8, as clearly shown in Figures 2, 3 and 5.

Figure 3:
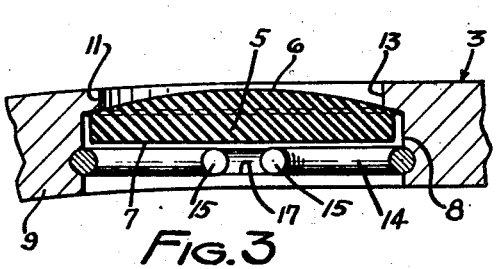
Figure 3 is a view similar to Figure 2, showing the sealing element forced into engagement with the annular seat provided in the opening in the container wall, thereby to prevent the escape of pressure from the cooking chamber.
Figure 6:
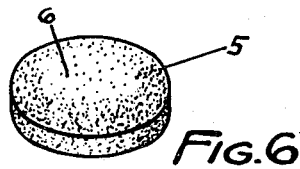
Figure 6 is a perspective view of the sealing element.
Figure 4:
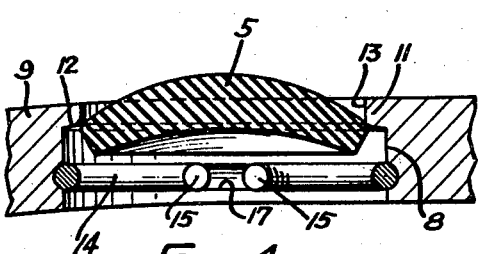
Figure 4 is a view similar to Figures 2 and 3, but showing the sealing element distorted and about to be blown from the opening in the container wall to permit the release of excessive pressure from the cooking chamber.

As soon as pressure begins to develop within the cooker following initial starting thereof, the sealing element 5 is moved by pressure into engagement with the seat 12, as shown in Figure 3, in which position it seals the opening 13 and prevents further escape of pressure from the cooking chamber during the cooking period.

When the cooking period has been terminated and the source of heat is cut off, if the pressure is not manually released from the cooker by manipulation of the usual pressure release valve, indicated at 18 in Figure 1, the pressure within the cooker body will gradually drop, and when it reaches atmospheric pressure the sealing element 5 will drop out of engagement with the seat 12 to the position shown in Figure 2, after which atmospheric pressure may enter the cooking chamber around the edge of the sealing element and through the gap 16 in the lockring, as will be understood by reference to Figure 5.

During the cooking operation, should the pressure within the cooker become excessive as result of failure of the usual safety release valve 18 to function, the sealing element 5 may become distorted as shown in Figure 4 as result of the pressure within the cooker, until it eventually is blown through the opening 13 whereby the interior of the cooker is suddenly opened to the atmosphere through the aperture 8 and opening 13, as will be understood by reference to Figure 4.

Should the sealing element thus be blown from its position in the aperture 8 by excessive pressure, it may readily be replaced in operative position therein by simply removing the lockring 14, as will be understood.

The novel device herein disclosed has been found extremely practical in actual operation. It is simple and inexpensive in construction and requires a minimum of operations to embody it in the wall of the container as will be understood. It will also be noted that should the attendant at any time wish to release pressure from within the cooker, he may readily manually do so by simply exerting a slight downward pressure upon the sealing element 5, preferably adjacent one edge thereof, when in the position shown in Figure 3, whereby the sealing element may be forced out of engagement with its seat.

It will be apparent to those skilled in the art that I have accomplished at least the principal objects of my invention, and it will also be apparent to those skilled in the art that the embodiments herein described may be variously changed and modified without departing from the spirit of the invention; and that the invention is capable of uses and has advantages not herein specifically described; hence it will be appreciated that the herein disclosed embodiments are illustrative only, and that my invention is not limited thereto.

I claim as my invention:

1. In a pressure cooker comprising a body having a cover secured thereto in fluid-tight relation, said cover having an aperture therein, an annular shoulder or seat in said aperture, a retaining member secured in said aperture and spaced from said seat, and a flexible element of rubber-like material supported in said aperture between said seat and said retaining member, said element being out of engagement with said seat when the cooker is initially started, whereby atmospheric air may escape from the cooker through said aperture, and said element sealingly engaging said seat to prevent leakage through the aperture when the pressure within the cooker reaches a predetermined value.

2. In a pressure cooker comprising a body having a cover secured thereto in fluid-tight relation, said cover having an aperture therein provided at its upper end with an annular inwardly facing seat defining a reduced opening, a disk-shaped sealing element of rubber-like material received in said aperture, a retaining ring removably interlocked with the wall of said aperture and spaced downwardly from said seat, thereby to loosely retain the sealing element between it and the seat, and said sealing element being movable into sealing engagement with said seat by fluid pressure from within the cooker, thereby to seal said aperture against leakage immediately following initial starting of the cooker, and said element being sufficiently elastic to yield when subjected to a predetermined pressure, whereby it may be moved out of sealing engagement with said seat and permit excessive pressure to escape from the cooker through said aperture.

3. In a pressure cooker comprising a body having a cover secured thereto in fluid-tight relation, said cover having an aperture therein provided at its upper end with an annular inwardly facing seat defining a reduced opening, a disk-shaped sealing element of rubber-like material received in said aperture whose diameter is relatively greater than the opening defined by said annular seat, a retaining ring removably interlocked with the wall of said aperture and spaced downwardly from said seat, thereby to loosely retain the sealing element between it and the seat, and said sealing element being movable into sealing engagement with said seat by fluid pressure from within the cooker, thereby to seal said aperture against leakage immediately following initial starting of the cooker, and said element being sufficiently elastic to yield when subjected to a predetermined pressure, whereby it may be blown through said opening to suddenly release pressure from the cooker, should the pressure become excessive therein.

4. In a pressure cooker having a cooking chamber, valve means in a wall of said chamber, said valve means being open when the cooker is initially started whereby atmospheric air may escape from the cooking chamber upon initial starting of the cooker, said valve means thereafter being operable by pressure within said chamber to prevent release of pressure therefrom during the interval of cooking, said valve means also being deformable by excess pressure in the cooking chamber, whereby it may be opened to permit such excess pressure to escape from said cooking chamber, and said valve means being movable to a position to admit air to said chamber after the pressure therein has been reduced to atmospheric pressure, thereby to prevent the formation of a vacuum in said chamber.

5. In a pressure cooker comprising a fluid-tight chamber having an aperture in a wall thereof provided with an annular inwardly facing seat, a flexible elastic disk-like element loosely received in said aperture and normally out of engagement with said seat when the pressure cooker is cold whereby the interior of the cooker is in communication with the atmosphere through the space between the wall defining the aperture and the periphery of the disk and the air in the cooker can escape therethrough on heating thereof, said element being movable into sealing engagement with said seat to seal the aperture against escape of pressure from the cooker under normal operating conditions thereof, and means for retaining the element in said aperture when the cooker is cold in operative relation to said seat, said element being sufficiently elastic to yield to excessive pressure within the chamber whereby it will become distorted and may thereby be forced out of sealing engagement with said seat and release excessive pressure from the cooker.

6. In a pressure cooker comprising a body having a cover secured thereto in fluid-tight relation, said cover having an aperture therein, an annular shoulder or seat in said aperture, retaining means in said aperture and spaced from said seat, and a flexible element of rubber-like material supported in said aperture between said seat and said retaining means with a space between its periphery and the wall defining said aperture thereby placing the interior of the cooker in communication with the atmosphere, said element being out of engagement with said seat and held by said retaining means when the cooker is initially started, whereby atmospheric air may escape from the cooker through said space and said aperture, and said element sealingly engaging said seat to prevent leakage through the aperture as a result of pressure generated within the cooker and applied to the element when the pressure reaches a predetermined value, said element subsequently returning to its initial position out of engagement with said seat, when the pressure in the cooker diminishes, thereby preventing the formation of a vacuum within the cooker during the cooling off period thereof.

7. In a pressure cooker comprising a body and a cover therefor adapted to be secured thereto in fluid-tight relation, a radially inwardly directed flange in said cover defining an aperture extending generally vertically therethrough and opening directly to the atmosphere, the underside of said flange forming a seat, a sealing element arranged to engage said seat by application thereto of pressure generated within the cooker to prevent relief of the same and to drop away therefrom under the influence of gravity when said pressure is not applied, and support means carried by said cover for said sealing element to hold the same in spaced relation underneath said seat in the absence of pressure in the cooker, said aperture communicating with the interior of the cooker except when said sealing element engages said seat to permit the escape therethrough of air from the cooker on building up of pressure therein and the entrance of air thereto on reduction of said pressure.

8. The invention, as set forth in claim 7, wherein the sealing element is a disk of flexible rubber-like material adapted to be blown through the aperture on the generation of predetermined pressure within the cooker to relieve the same.

9. In a pressure cooker comprising a body having a cover secured thereto in fluid-tight relation, a radially inwardly extending flange in said cover defining an aperture opening directly to the atmosphere with the underside forming an annular seat below the outer surface of said cover; a flexible disk of rubber-like material arranged under normal operating conditions to engage said seat by application thereto of pressure generated within the cooker, and to move away therefrom when such pressure is reduced to zero, and to be blown through said aperture on the generation of predetermined abnormal pressure within the cooker to relieve the same; and retaining means carried by said cover for supporting said disk in spaced relation underneath said seat to function as aforesaid and to form a part of the cooker wall provided by the cover.

10. The invention, as set forth in claim 9, wherein the movement of the disk under normal operating conditions takes place between the outer and inner surfaces of the cover, and the retaining means extends from the wall in said cover forming the aperture.

11. In a pressure cooker or container comprising separable container elements secured together in fluid-tight relation, a radially inwardly extending flange in one of said elements defining an aperture opening to the atmosphere with the side toward the space enclosed by the container forming an annular seat; a flexible disk of rubber-like material arranged under normal operating conditions to engage said seat by application thereto of pressure generated within said container, and to move away therefrom when such pressure is reduced to zero, and to be blown through said aperture on the generation of predetermined abnormal pressure within said container to relieve the same; and retaining means for supporting said disk in spaced relation relative to said seat to function as aforesaid and to form a part of the container wall.

EDWARD H. WITTENBERG.

REFERENCES CITED

The following references are of record in the file of this patent:

UNITED STATES PATENTS

| Number | Name | Date |
|---|---|---|
| 943,951 | Moody | Dec. 21, 1909 |
| 1,423,323 | Hazard | July 18, 1922 |
| 1,749,128 | Buss | Mar. 4, 1930 |
| 1,990,601 | Godsey | Feb. 12, 1935 |
| 2,195,266 | Bailey | Mar. 26, 1940 |
| 2,254,557 | Wittenberg | Sept. 2, 1941 |
| 2,301,724 | Vischer, Jr. | Nov. 10, 1942 |